(12) United States Patent
Lagrandcourt et al.

(10) Patent No.: US 10,821,796 B2
(45) Date of Patent: Nov. 3, 2020

(54) VERSATILE URBAN ELECTRIC TRANSPORT DEVICE AND SYSTEM

(71) Applicant: Ford Global Technologies, LLC, Dearborn, MI (US)

(72) Inventors: Aurelien Lagrandcourt, Preston (AU); Navneet Bhasin, Preston (AU)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/087,638

(22) PCT Filed: Sep. 9, 2016

(86) PCT No.: PCT/US2016/050884
§ 371 (c)(1),
(2) Date: Sep. 22, 2018

(87) PCT Pub. No.: WO2017/164926
PCT Pub. Date: Sep. 28, 2017

(65) Prior Publication Data
US 2019/0084364 A1 Mar. 21, 2019

Related U.S. Application Data

(60) Provisional application No. 62/311,981, filed on Mar. 23, 2016.

(51) Int. Cl.
*B60G 17/0165* (2006.01)
*B60L 50/50* (2019.01)
(Continued)

(52) U.S. Cl.
CPC ........ *B60G 17/0165* (2013.01); *B60B 19/003* (2013.01); *B60K 1/04* (2013.01);
(Continued)

(58) Field of Classification Search
CPC .......... B60G 17/0165; B60G 2800/019; B60L 50/50; B60B 19/003; B60K 1/04;
(Continued)

(56) References Cited

U.S. PATENT DOCUMENTS 4,618,156 A 10/1986 Kato et al.
7,273,116 B2 9/2007 Kamen et al.
(Continued)

FOREIGN PATENT DOCUMENTS

| CN | 101600618 A | 12/2009 |
|---|---|---|
| CN | 201862241 U | 6/2011 |

(Continued)

OTHER PUBLICATIONS

Russian Office Action as issued by the Russian Patent Office dated Feb. 21, 2020 (in Russian—no English translation available).
(Continued)

*Primary Examiner* — Gertrude Arthur Jeanglaude
(74) *Attorney, Agent, or Firm* — Brandon Hicks; Bejin Bieneman PLC

(57) ABSTRACT

Disclosed herein is a transport device with a platform that pivots relative to a frame of the transport device. A pivot angle of the platform is altered with an actuator controlled by a transport computer. The pivot angle is based, at least in part, on a predicted change in velocity, a determined change in ground surface, a determined ground slope, and a center of gravity of a user and of the transport device.

17 Claims, 15 Drawing Sheets

(51) Int. Cl.
  *B62D 51/02* (2006.01)
  *B62D 61/00* (2006.01)
  *B60B 19/00* (2006.01)
  *B60K 1/04* (2019.01)
  *B60K 7/00* (2006.01)
(52) U.S. Cl.
  CPC ............ *B60K 7/0007* (2013.01); *B60L 50/50* (2019.02); *B62D 51/02* (2013.01); *B62D 61/00* (2013.01); *B60G 2800/019* (2013.01); *B60K 2001/0438* (2013.01); *B60Y 2200/91* (2013.01)
(58) Field of Classification Search
  CPC .......... B60K 7/0007; B60K 2001/0438; B62D 51/02; B62D 61/00; B60Y 2200/91
  USPC .......................................................... 701/37
  See application file for complete search history.

(56) References Cited

U.S. PATENT DOCUMENTS

| | | | |
|---|---|---|---|
| 7,866,429 | B2 | 1/2011 | Ishii et al. |
| 7,962,256 | B2 | 6/2011 | Stevens et al. |
| 8,224,524 | B2 | 7/2012 | Nakashima et al. |
| 8,430,192 | B2 | 4/2013 | Gillett |
| 8,469,449 | B2 | 6/2013 | Kao |
| 2009/0288900 | A1 | 11/2009 | Takenaka et al. |
| 2010/0023220 | A1 | 1/2010 | Nakashima et al. |
| 2011/0010024 | A1 | 1/2011 | Salisbury |
| 2014/0107868 | A1 | 4/2014 | DiGiacomcantonio et al. |

FOREIGN PATENT DOCUMENTS

| | | |
|---|---|---|
| CN | 202911836 U | 5/2013 |
| CN | 204222578 U | 3/2015 |
| RU | 2506157 C1 | 2/2014 |
| WO | 0236419 A1 | 5/2002 |

OTHER PUBLICATIONS

Wireless Remote Control Mecanum Wheel Toy Car OMRC05, retrieved on Mar. 25, 2016 from Internet URL: http://robotjungle.net/en/product/Mecanum-Wheel-Car-OMRC05.html (2 pages).

Notification of Transmittal of International Search Report and Written Opinion of International Searching Authority dated Nov. 18, 2016 regarding International Application No. PCT/US2016/050884 (14 pages).

Chinese First Office Action as issued by the Chinese Patent Office dated Dec. 13, 2019.

Chinese Second Office Action as issued by the Chinese Patent Office dated Aug. 27, 2020 (in both Chinese and English).

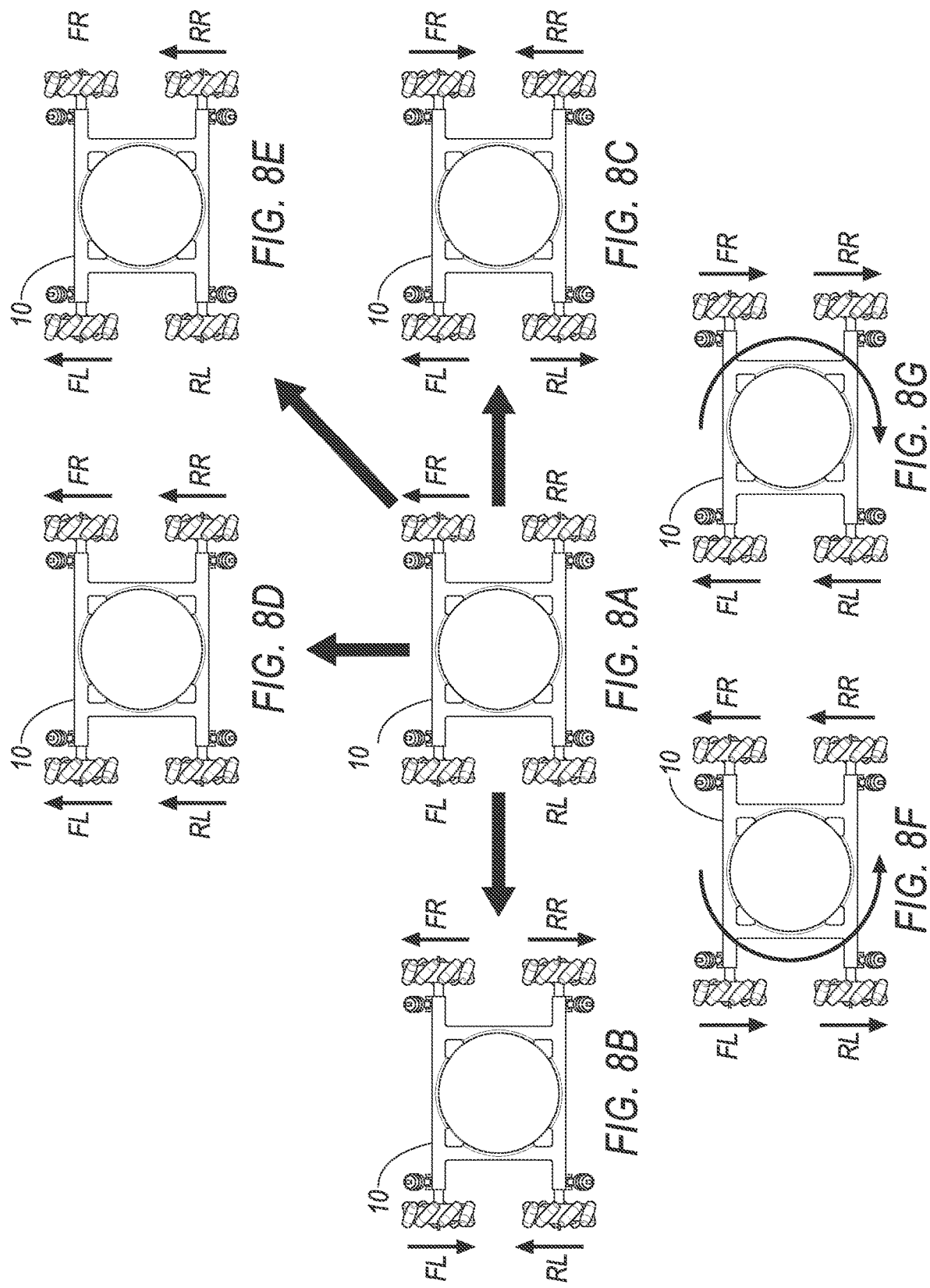

VERSATILE URBAN ELECTRIC TRANSPORT DEVICE AND SYSTEM

CROSS-REFERENCE TO RELATED APPLICATIONS

The subject patent application claims priority to and all the benefits of U.S. Provisional Patent Application No. 62/311,981 filed on Mar. 23, 2016, which is herein incorporated by reference in its entirety.

BACKGROUND

Today fifty-four percent of the world's population is living in urban areas. In the next three decades, that portion is expected to increase to sixty-six percent. Projections show that urbanization combined with the overall growth of the world's population could add another 2.5 billion people to urban populations by 2050. With this rise in population density, it will become increasingly difficult for commuters, residents, tourists, elderly and disabled people to get around, even over short distances. Even when using personal transportation, i.e., an automobile, a bicycle or the like, it can often mean facing horrific traffic jams and long parking queues due to limited roadway infrastructure and space available to park. Yet further, public transportation presents problems, e.g., overcrowding, inconvenient schedules, etc. Even further, the financial cost of travelling a short distance often cannot be justified.

BRIEF DESCRIPTION OF THE DRAWINGS

FIGS. 8A to 8G are views illustrating the driving principle of Mecanum wheels of the versatile electric transport device of FIG. 1.

DETAILED DESCRIPTION

Figure 1:
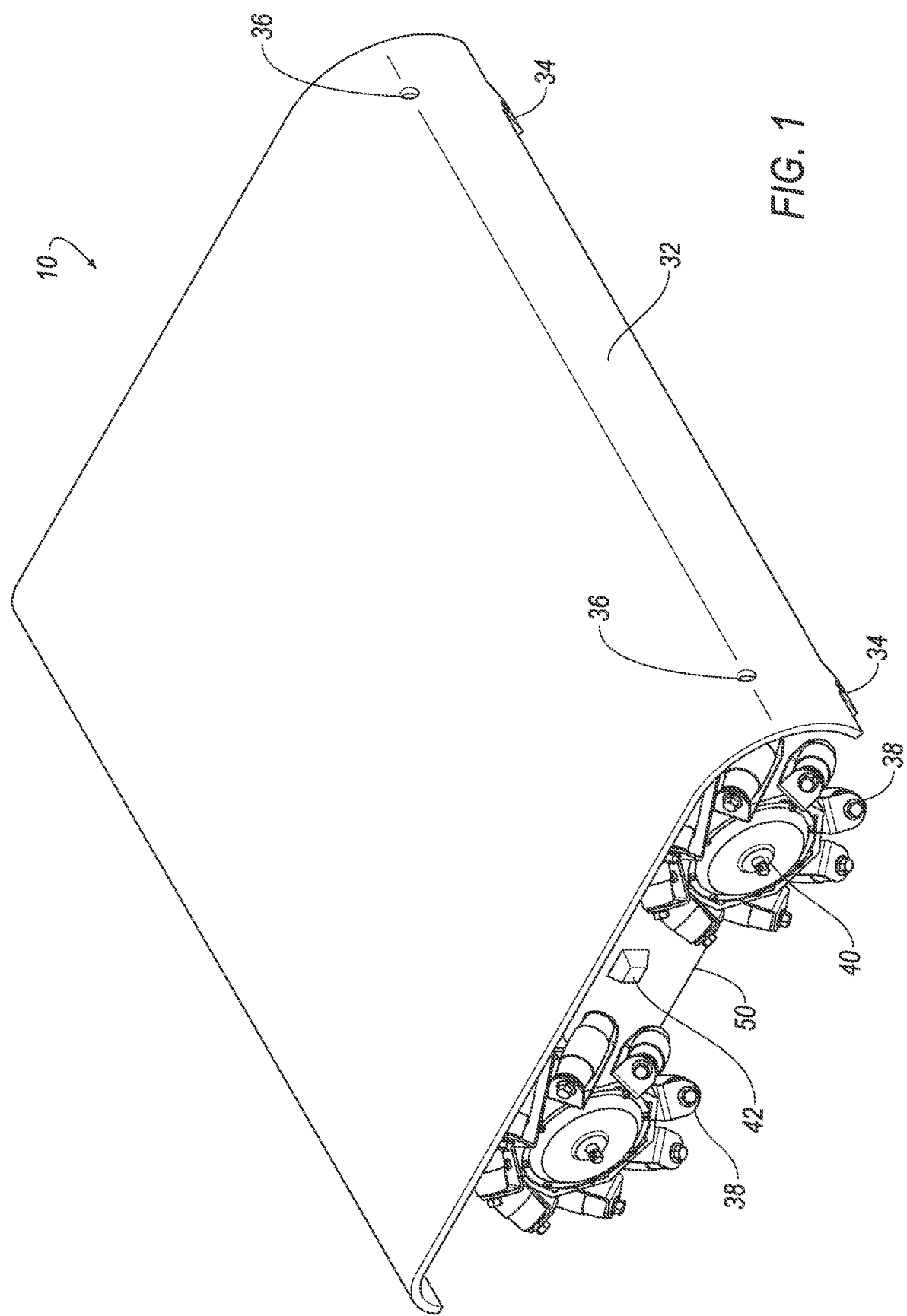
FIG. 1 is a perspective view of an exemplary versatile electric transport device.

A smart and versatile electric transport 10 can carry a full size adult over a reasonable distance, e.g., about five miles in one example, and can be deployed in a dense urban environment. The transport is equipped with a set of positional sensors 18 to monitor the transport's status, e.g., the transport's load, slope, acceleration, rotation and inclination. The transport can also be furnished with obstacle and avoidance sensors, i.e., cameras, radars, lidars, sonars and the like to avoid obstacles. The transporter can be fitted with an array of communication/navigation devices, i.e., a Global System for Mobile Communications (GSM) module, a General Packet Radio Service (GPRS) module, a Wi-Fi module, a WiMax module, a Long-Term Evolution (4G LTE) module, a Bluetooth module and a Global Navigation Satellite System (GNSS) receiver. The exemplary transport is outfitted with Mecanum wheels that enable omnidirectional movement and further includes a suspension system which controls a hemispherical tilting mechanism to provide comfort as well as to keep a user balanced during movement in particular acceleration, deceleration and curves.

Referring to the Figures, wherein like numerals indicate like or corresponding parts throughout the several views, a versatile electric transport device 10 is generally shown in FIGS. 1-4 and 11. The transport device 10 includes a platform 32 mounted to a frame 50. The platform 32 and the frame 50 can be any light and durable material, for example, aluminum, carbon fiber, plastic, etc. The platform includes one or more of each of an imaging sensor 34 and a proximity sensor 36 mounted thereto and/or disposed therein. The imaging sensor 34 can be, for example, a camera imaging system to provide vision guidance for the versatile electric transport device 10. Alternatively, the imaging sensor can be a lidar system. The proximity sensor 36 can be an ultrasonic device that emits high-frequency sound waves and that as is known to detect a presence of a nearby object by evaluating an echo from the emitted sound waves. Other types of proximity sensor 36 which can be utilized include capacitive, Eddy-current, inductive, laser rangefinder, charge-coupled, passive thermal infrared, photocell, radar and sonar, just to name a few.

A hub motor 54 is mounted to an axle 51 on the frame 50. The hub motor 54 is fitted into an omnidirectional wheel such as a Mecanum wheel 40. The Mecanum wheel, as is known, is a wheel that can move a vehicle in any direction by deploying a series of rollers 38 attached to a wheel circumference. The rollers 38 typically each have an axis of rotation at 45° to the plane of the wheel 40 and at 45° to a line through the center of the roller parallel to the axis of rotation of the wheel 40. In order to improve the operational time of the transport device 10, different roller 38 angles can be utilized, for example, a smaller roller 38 angle can increase the transport device 10 efficiency when moving forward and backward. An electronic speed controller (ESC) 16 can be used to control the motor 54. The ESC 16 is an electronic circuit which varies an electric motor's speed, direction and dynamic braking. The ESC 16 is connected to the transport computer 66 via a transport device network.

The frame 50 also provides an attachment point for a communications module 42 and/or a navigation module 43. The communications module 42, for example, can be a telematics unit to provide radio frequency communications via a Global System for Mobile Communications (GSM) connection, a General Packet Radio Service (GPRS) connection, Wi-Fi connection, a WiMax connection, Bluetooth connection or a Long-Term Evolution (4G LTE) connection. The navigation module 43 can be equipped with a Global Navigation Satellite System (GNSS) receiver, for example to receive a satellite global positioning system (GPS) signal.

Additionally, a rechargeable battery 13 can be mounted to the frame 50 and can be of any type of rechargeable battery, including and not limited to a lead-acid battery, a lithium cobalt oxide battery, a lithium iron phosphate battery, a lithium manganese oxide battery, a lithium nickel cobalt aluminum oxide battery, a lithium nickel manganese cobalt oxide battery, a low self-discharge nickel-metal hydride battery, a nickel-cadmium, a nickel-hydrogen, a nickel-iron, a nickel-metal hydride, a nickel-zinc and a rechargeable alkaline battery. The rechargeable battery 13 provides energy to the hub motors 54, the positional sensors 18, the transport computer 66 and all other electrical systems of the transport device 10. In some configurations, each hub motor 54 can have its own dedicated reachable battery 13. The transport computer 66 can monitor a status rechargeable battery 13 and determine its available range. Charging of the rechargeable battery 13 can be achieved by a direct plug-in connection or with an induction charging system.

Figure 6:
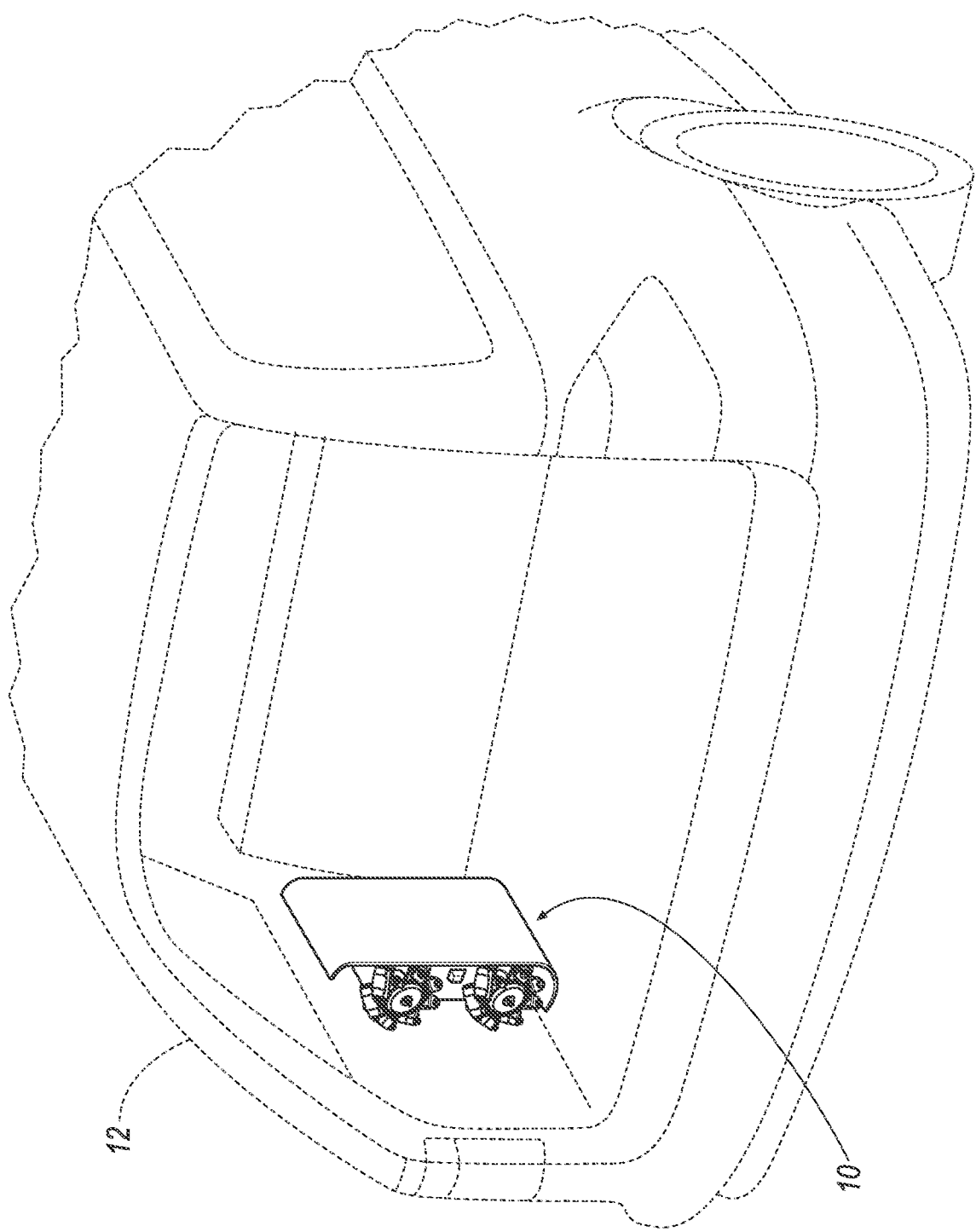
FIG. 6 is a perspective view of the versatile electric transport device stored in a storage area of a vehicle of FIG. 1.

The versatile electric transport device 10 is highly transportable and, as shown in FIG. 6, can be stowed in a hatchback or a trunk of a vehicle 12. This permits the user 28 to park at a parking facility, retrieve the versatile electric transport device 10 from his or her vehicle and finish his or her commute on the versatile electric transport device 10. Further, the user 28 can use the versatile electric transport device 10 to carry, for example, luggage or their groceries. In addition to be highly transportable, versatile electric transport device can be upgrade and/or reconfigured with extensions, for example, a wheel chair extension permitting the versatile electric transport device 10 to be a stable highly maneuverable non-ambulatory patient transport.

Figure 2:
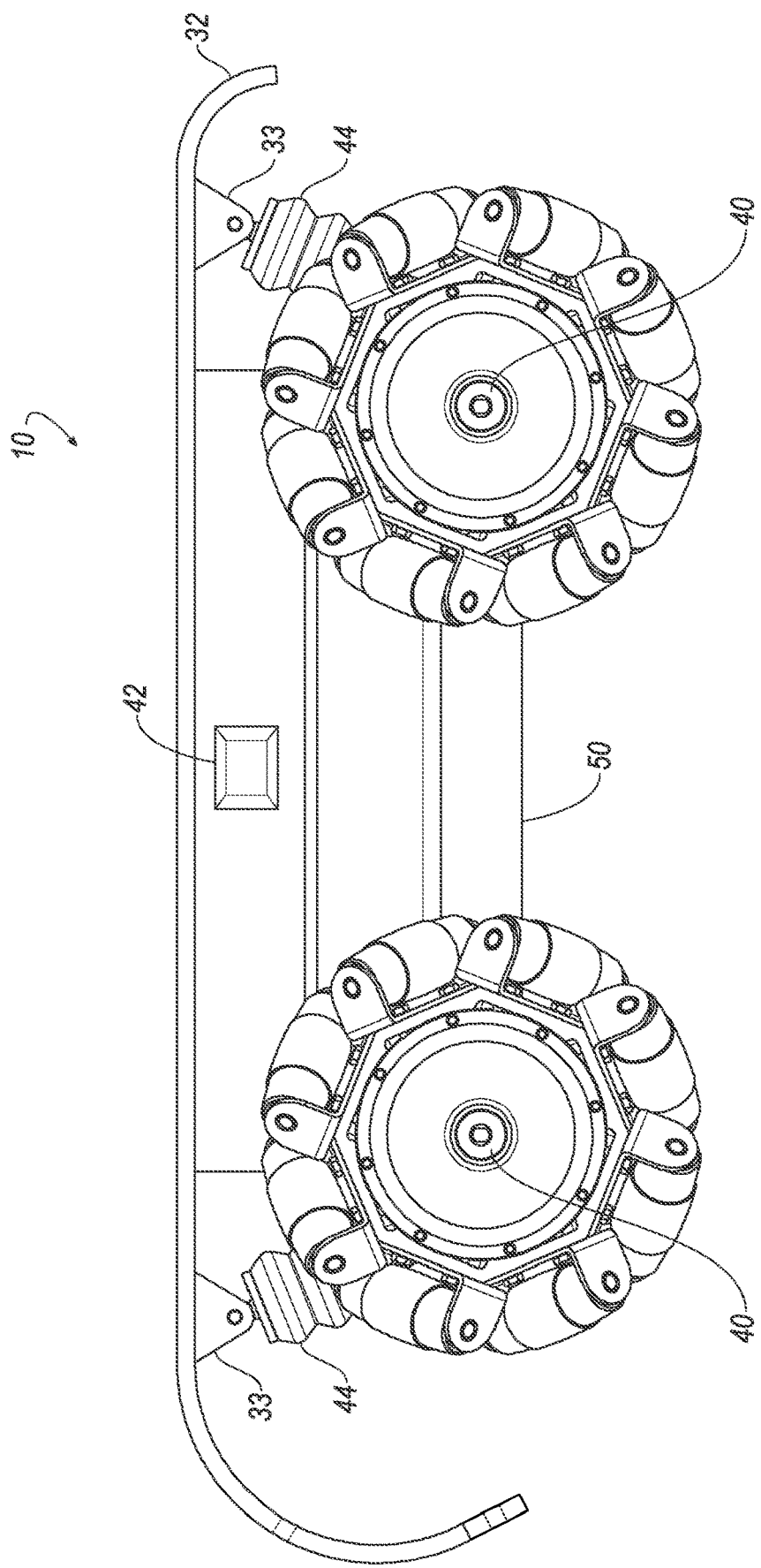
FIG. 2 is a side perspective view of the versatile electric transport device of FIG. 1.
Figure 3:
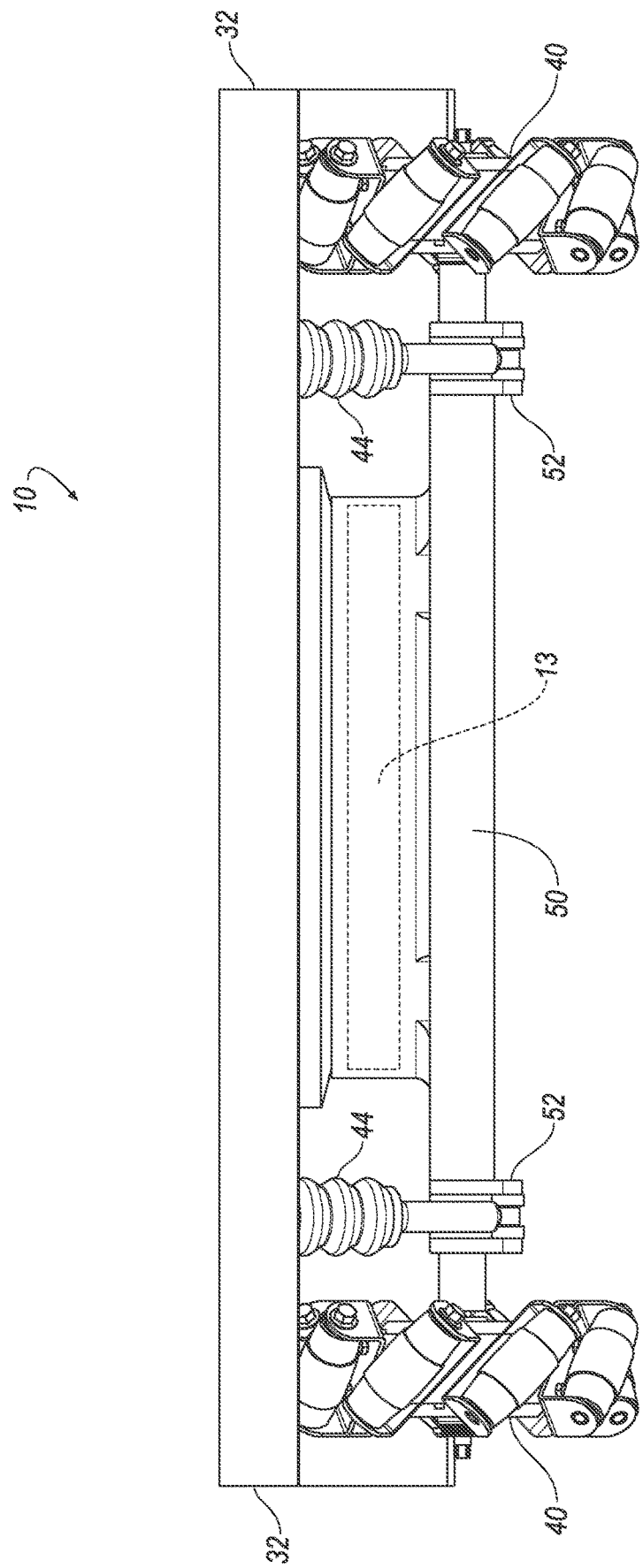
FIG. 3 is a rear perspective view of the versatile electric transport device of FIG. 1.
Figure 4:
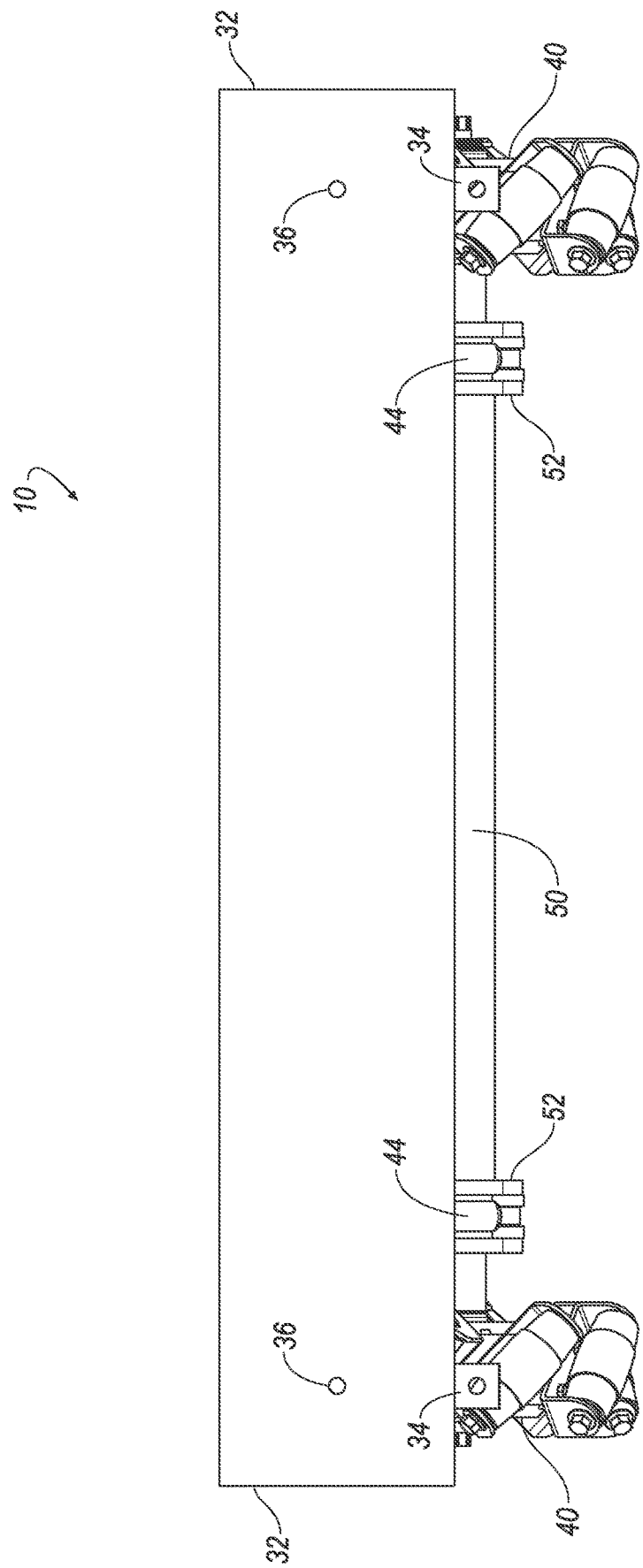
FIG. 4 is a front perspective view of the versatile electric transport device of FIG. 1

An actuator 44 controls and stabilizes the platform 32 of the versatile electric transport device 10 as shown for example in FIGS. 2-3. The actuator 44 can be an electric actuator, a hydraulic actuator, a pneumatic actuator or any controllable mechanical device that converts energy into motion. In addition, the actuator 44 can also absorb and damp shock impulses, for example, when the versatile electric transport device 10 encounters a pothole. The actuator 44 can be further combined with a spring mechanism to improve stability.

Figure 7:
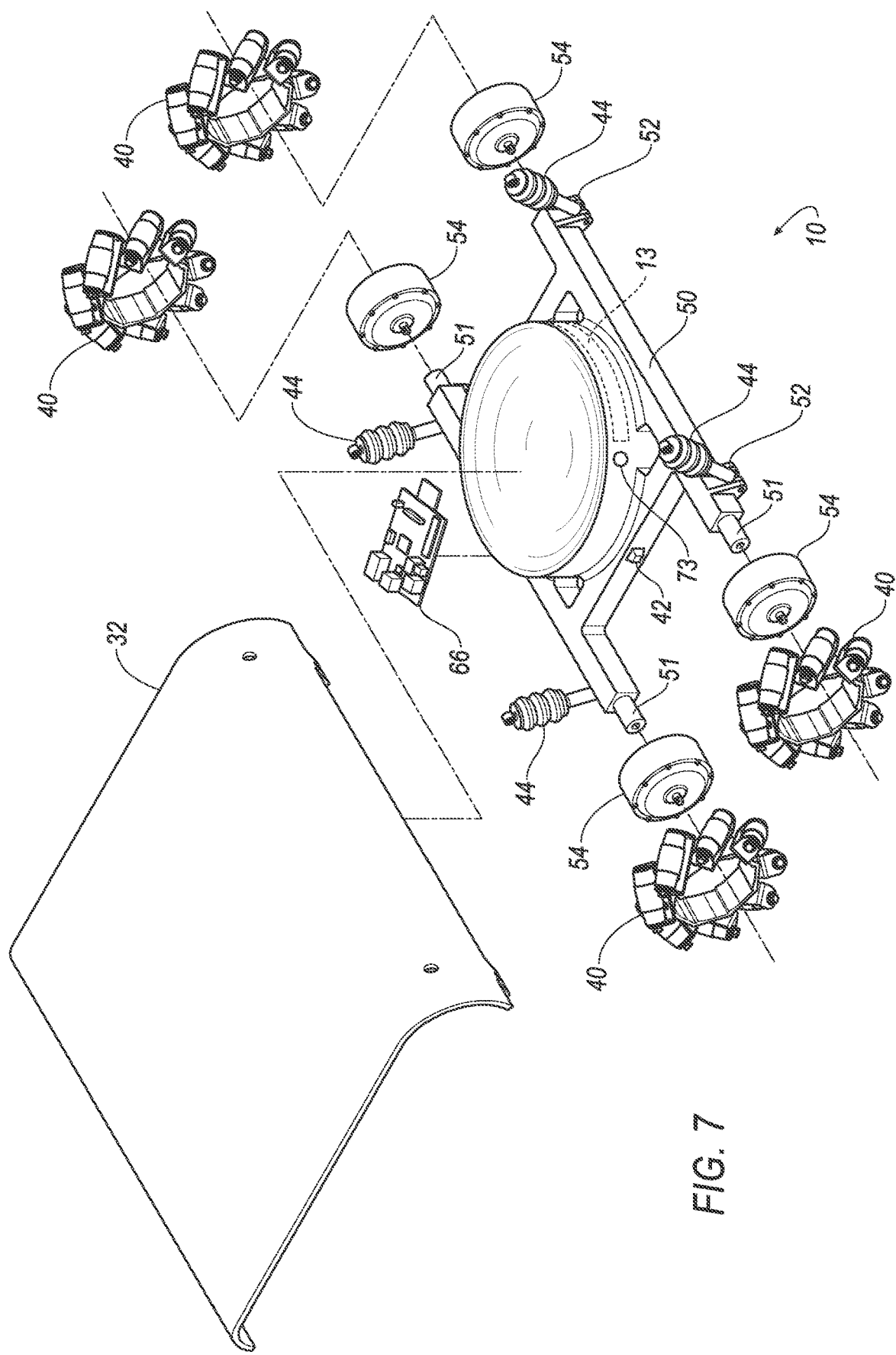
FIG. 7 is a fragmentary exploded perspective view of the versatile electric transport device of FIG. 1.

A first end of the actuator 44 is attached to the frame 50 with a pin joint at a pin joint mounting location 52 and a second end of the actuator 44 is attached to the platform 32. A weight sensor in communication with the transport computer may be secured proximate the mounting location 52 of each actuator 44. The actuator 44 is controlled by signals from a transport computer 66, as shown in FIG. 7 to keep the platform 32 level, e.g., a plane defined by a top surface of the platform 32 may be maintained within a predetermined tolerance, e.g., three degrees, five degrees, etc., of deviation from a plane that is parallel to a ground surface on which the device 10 is situated. The position of the actuator 44 can be sent to the transport computer 66. The actuator 44 can reduce sudden changes to the ground surface, for example, a rut or a pot hole. The actuator 44 can also adjust the platform 32 tilt when the versatile electric transport device 10 is about to change velocity, examples of changes in velocity include accelerating, decelerating, and turning. A change in velocity can be predicted according to an input to, or a determination by, the computer 66 to accelerate or brake the transport device 10. The transport device 10 is "about to" change velocity after such input or determination is detected, and before it is applied. For example, implementation of a change in velocity could be delayed for a short period of time, e.g., 500 milliseconds, to allow for movement of the platform 32. The transport computer 66 uses inputs from various sensors along with a desired course to adjust the positioning of the actuator 44, for example, using an inverted pendulum algorithm such as is known to be applied to balance control systems associated with objects having a center of gravity above a pivot point.

Using the inverted pendulum algorithm, the system helps a user to maintain balance by angling the platform 32 towards the predicted change in velocity. To keep the user balanced during acceleration, the front actuators 44 compress and the rear actuators 44 expand to tilt the platform 32 forward. To keep the user balanced during deceleration, the rear actuators 44 compress and the front actuators 44 expand to tilt the platform 32 rearward. To keep the user balanced during a right turn, the right hand side actuators 44 compress and the left hand side actuators 44 expand to tilt the platform 32 inboard and compensate for centrifugal force. Similarly, for a left turn, the left hand side actuators 44 compress and the right hand side actuators 44 expand.

Figure 5:
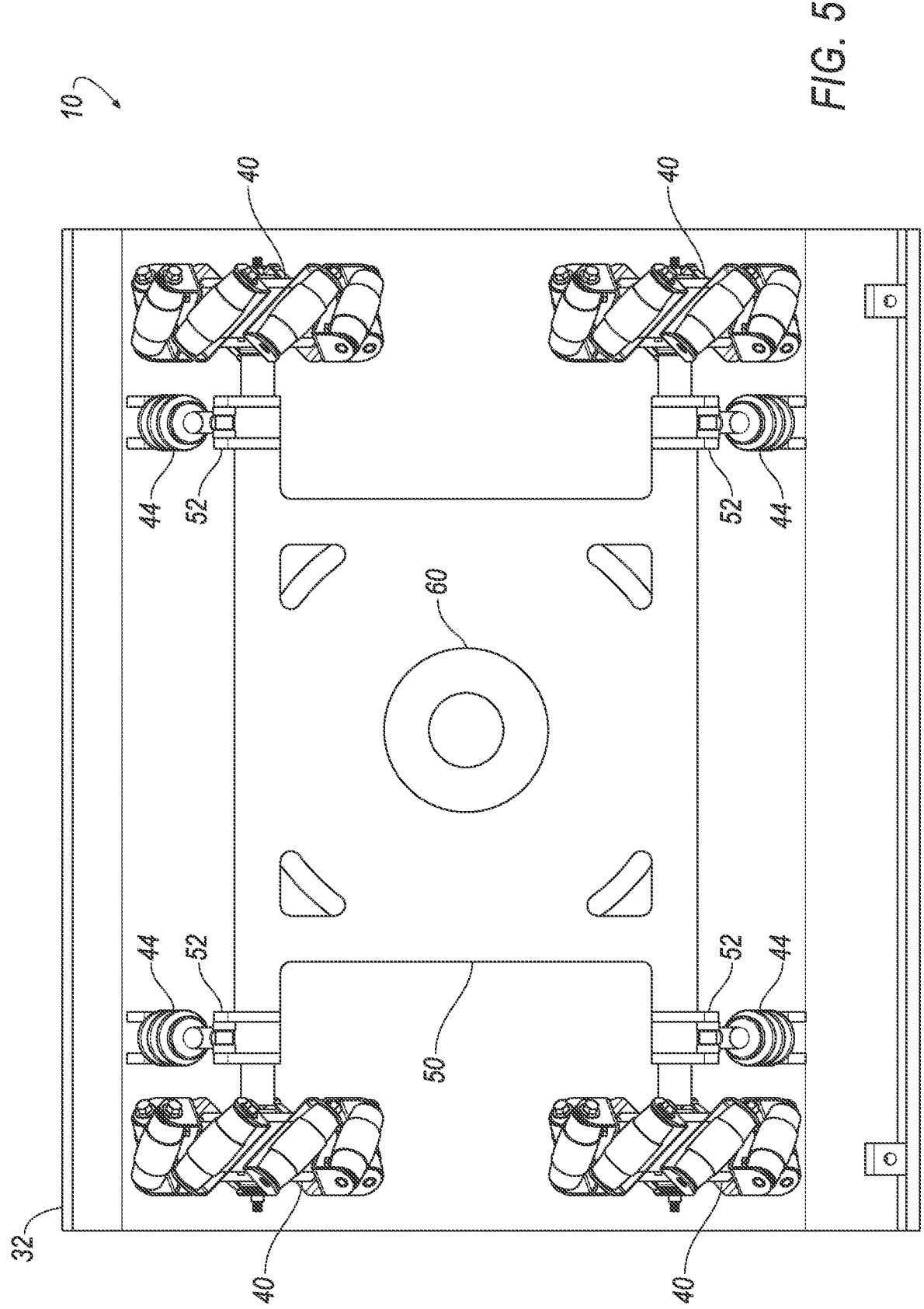
FIG. 5 is a bottom perspective view of the versatile electric transport device of FIG. 1.

As shown in FIG. 5, an inductive charging port 60 is positioned on the bottom (closest to the ground) of the versatile electric transport device 10. The inductive charging port 60 uses an electromagnetic field to transfer energy between a charging station and the inductive charging port 60. Energy is sent through inductive coupling of the charging station to the inductive charging port 60 to charge the rechargeable battery 13 of the versatile electric transport device 10.

As shown in FIG. 7, an electric motor 54 is attached to the frame 50 and to each of the Mecanum wheels 40. The transport computer 66, as well as any other computers discussed herein, has at least one processor and typically has a memory, e.g., comprising various types of permanent and transient memory such as are known to store computer instructions, register values, and temporary and permanent variables. Further, the transport computer 66 can generally include instructions for sending and/or receiving vehicle control data, e.g., from and to a user 28 or an operator of the versatile electric transport device 10, for example via a mobile device, a smartphone and a portable computer. The vehicle control data can be, for example, instructions sent from a smartphone along with the smartphone's geolocation commanding the transport device 10 to navigate its way to the smartphone's geolocation. Another example of vehicle control data is another set of commands sent by the smartphone and the transport device 10 acknowledgement of those commands, for example, the smartphone can continually send the smartphone's geolocation to the transport device 10 along with a command to follow the smartphone, causing the transport device 10 to follow the smartphone. The vehicle control data can be used by the transport computer 66 to predict a change in velocity of the transport device 10. For example, the computer 66, and/or other controllers such as the electronic speed controller 16, receives (or determines) instructions to transport device 10 motors 54 and/or brakes to control changes in velocity.

The versatile electric transport device 10 transport computer 66 is typically connected to other computers, for example, to the electronic speed controller (ESC) 16 to control the motor 54 via a transport device network. The ESC 16 is also connected to a power source, i.e., the rechargeable battery 13 and to the motor 54. Additionally, the transport device 10 communications may occur, i.e., over a Serial Peripheral Interface (SPI) bus, an Inter-Integrated Circuit (I$^2$C) bus or a Controller Area Network (CAN) bus such as is known. Other wired and wireless communications can be included in the versatile electric transport device 10 network, e.g., Ethernet, Wi-Fi®, Bluetooth®, etc. Further, the vehicle can communicate with other networks or vehicles as described below, and may include wireless networking technologies, e.g., cellular, Wi-Fi®, Bluetooth®, Near Field Communication (NFC), wired and/or wireless packet networks, etc.

The movement of versatile electric transport device 10 using the Mecanum wheels 40 is shown in FIGS. 8A to 8G. FIG. 8A is the versatile electric transport device 10 at rest and no Mecanum wheels are turning. FIG. 8B illustrates the versatile electric transport device 10 moving to the left. The arrows shown indicate the rotation of the wheels, for example, the front left (FL) wheel, is turning relatively clockwise, the right rear (RR) wheel is turning relatively counterclockwise, the front right (FR) wheel is turning relatively counterclockwise and the right rear (RR) wheel is turning clockwise. FIGS. 8C, 8D and 8E illustrate the versatile electric transport device 10 moving to the right, forward and diagonally forward to the right. FIGS. 8F and 8G illustrate how the versatile electric transport device 10 can rotate to the left and to the right, respectively.

Figures 9A, 9B:
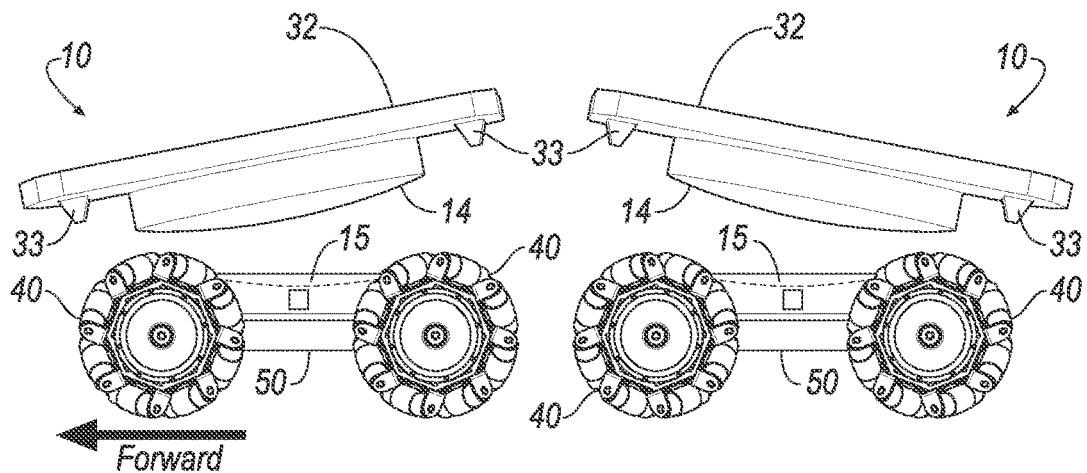
FIGS. 9A to 9E are perspective views of a tilting mechanism deployed in the versatile electric transport device of FIG. 1.
Figures 9C, 9D:
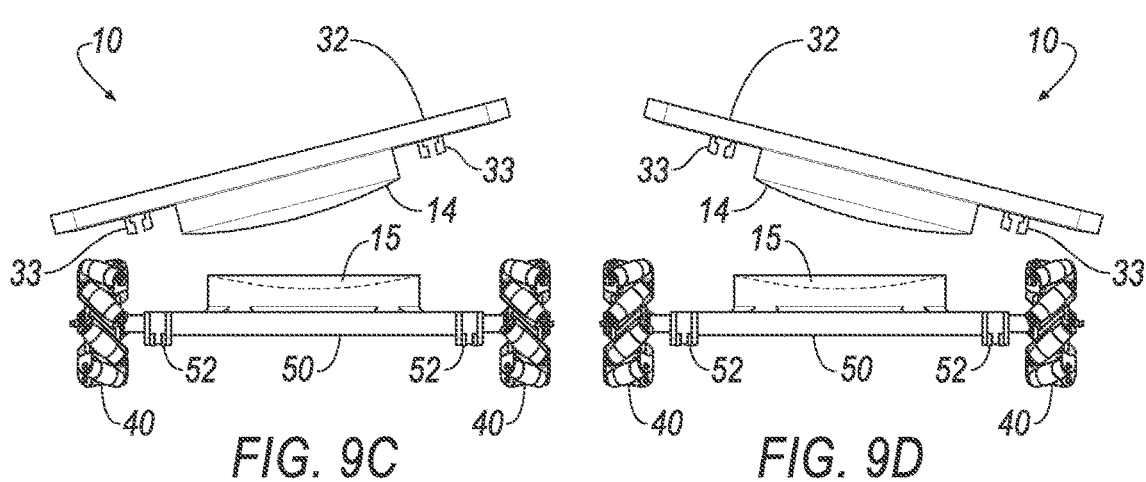
Figure 9E:
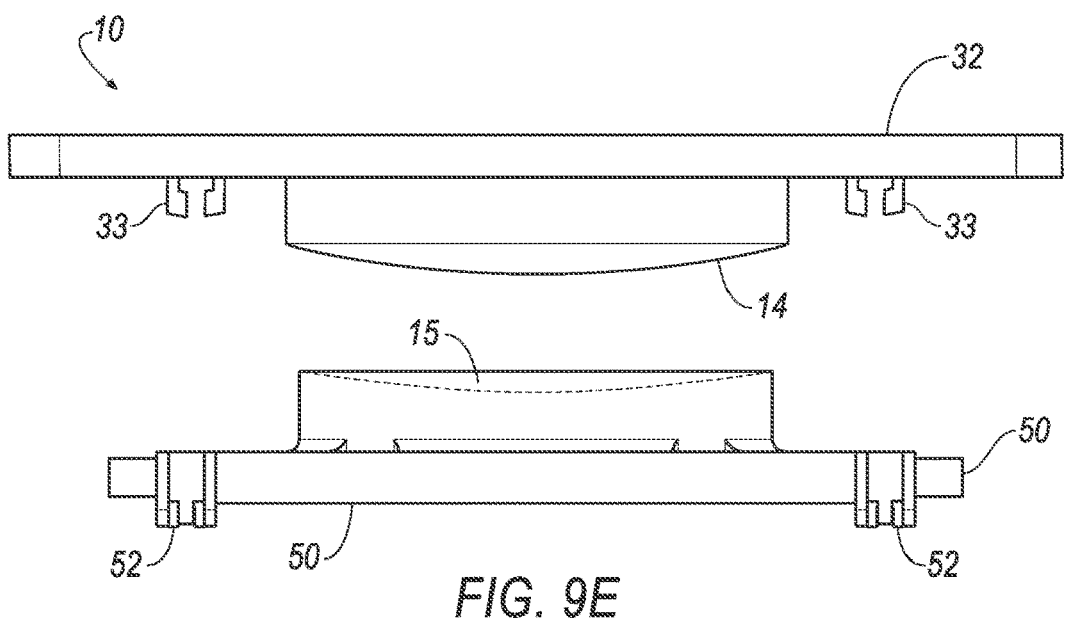

The inclination or tilt of the platform 32 of the versatile electric transport device 10 is illustrated in FIGS. 9A-9E. The platform 32 has a convex face 14 which abuts a concave face 15 of the frame 50 permitting the platform 32 to pivot about the frame 50. FIGS. 9A and 9B illustrate a forward and a backward tilting of the platform 32 on the frame 50 as realized by the actuator 44. FIGS. 9C & 9D illustrate a left and a right tilting of the platform on the frame 50 as realized by the actuator 44. FIG. 9E is a close up view of the convex face 14 of the platform 32 and the concave face 15 of the frame 50.

Figure 10A:
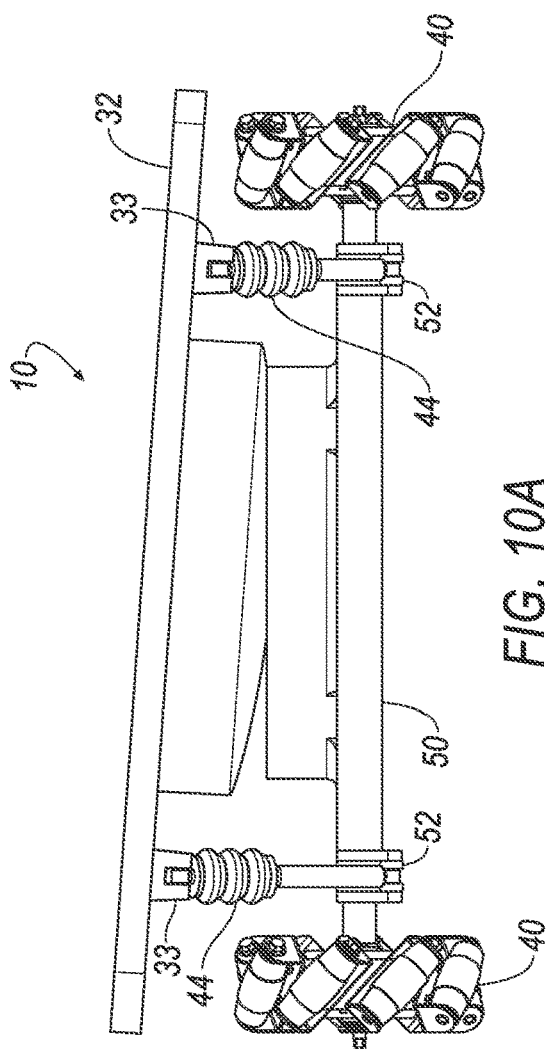
FIGS. 10A and 10B are additional perspective views of the tilting mechanism.
Figure 10B:
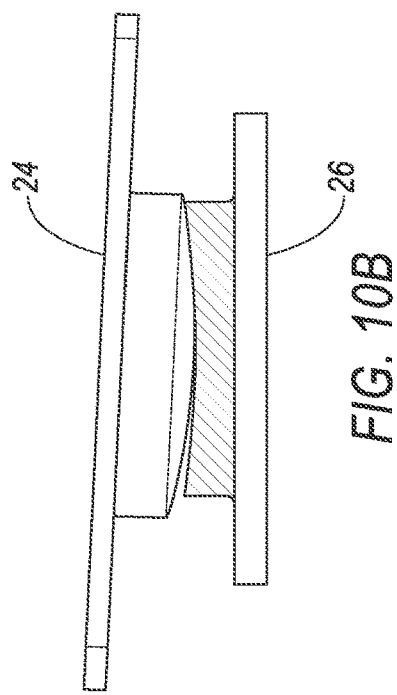
Figure 10C:
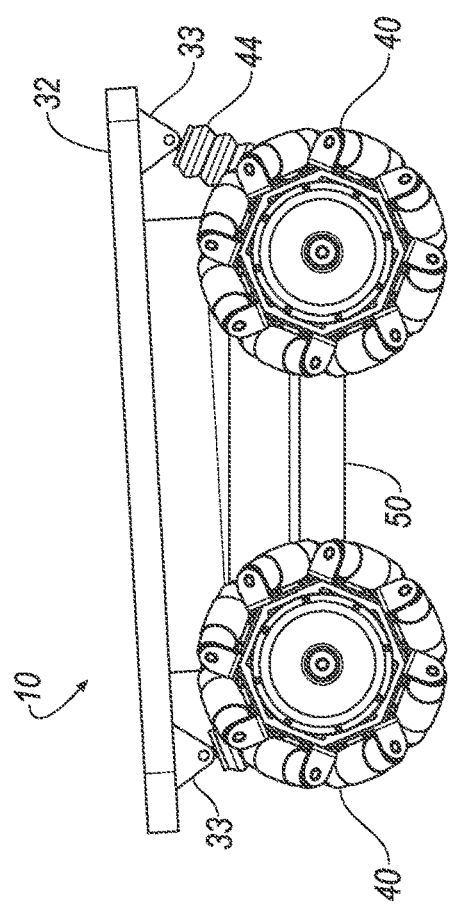
FIGS. 10C and 10D are rudimentary representative views of the tiling mechanism.
Figure 10D:
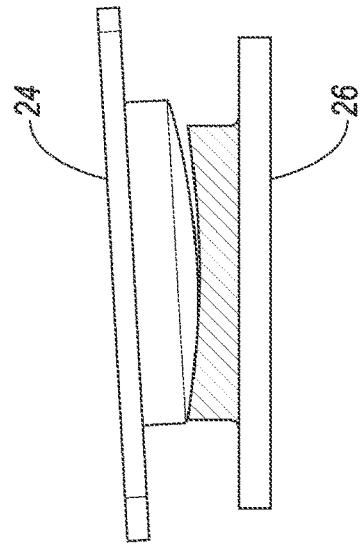

As discussed above, the actuator 44 tilts the platform 32 upon the frame 50 and is illustrated in FIGS. 10A and 10C. FIGS. 10B and 10D illustrate a simplified schematic of the tilting illustrated in FIGS. 10A and 10C. The forward and back tilting of the platform 32 along with its side to side tilting enables the transport device 10 to help the user 28 maintain their balance. The transport device 10 determines the combined center of gravities of the transport device 10 and that of the user 28 and manages their combined inertias, which results in the user 28 balance being maintained. The center of gravity determination is based at least in part on the information received by transport computer 66 from the weight sensors that are proximate the actuators, and levelling sensors, such as gyroscopic sensors, in the platform 32 and frame 50.

The versatile electric transport device 10 is highly transportable and as shown in FIG. 6, it can be stowed in a hatchback or a trunk of a vehicle 12. This permits the user 28 to park at a parking facility, retrieve the versatile electric transport device 10 from their vehicle and finish their commute on the versatile electric transport device 10. Alternatively, the user 28 can use the versatile electric transport device 10 to carry cargo, for example, luggage or groceries.

Figure 11:
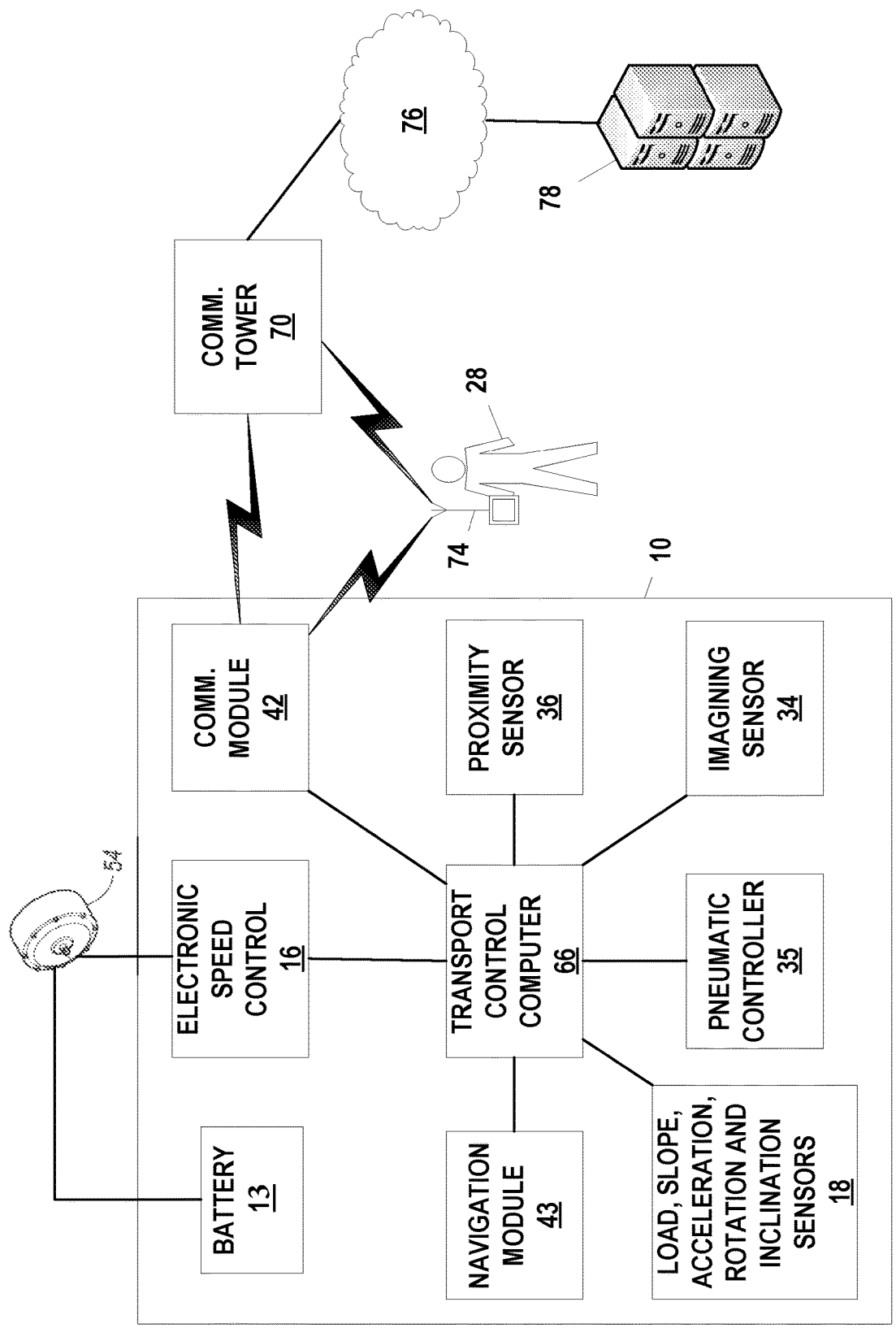
FIG. 11 is a block diagram of a transport system including the device of FIG. 1.

A block diagram of the versatile electric transport device connection to communication and navigation devices is illustrated in FIG. 11. The versatile electric transport device 10 is communicatively coupled to a communications tower 70, a geolocation satellite 72 and a communications device 74. The communication tower 70 can provide a connection to a cloud network 76, for example, the Internet via a GSM or 4G. The cloud network 76 is further communicatively connected to a server 78.

The server 78 is one or more computer programs and a computing device on which the programs are executable. The server 78 provides operations for other programs or devices, called "clients." Operations provided by the server 78 are often called "services", and can include sharing data or resources among multiple clients, or performing computation for a client. The server 78, for example, can execute a transport request program that processes the user 28 request for a transport and forwards the request to the versatile electric transport device 10 over the network 76. The transport request program, for example, can handle the initial request for transport and all additional communications exchanges between the user 28 and the versatile electric transport device 10.

The server 78 can include or be connected to a database that stores information regarding the transport devices in the area, local and regional maps, traffic and weather information. This information permits the server 78 or the transport computer 66 to calculate the fastest or the most economical route for battery life when requested, for example, when the transport computer 66 determines that the status of the rechargeable battery 13 is low, the transport computer 66 can request routing information from the server permitting the transport device 10 to traverse via the most economical route. In a worst case scenario, the transport computer 66 can detect that the rechargeable battery 13 of the transport device 10 is near depletion or a system fault. The transport computer 66 can then request a backup transport device to rendezvous with the transport device 10 and exchange the passenger or the payloads and continue the journey on the backup transport device.

The geolocation satellite 72 can be a Global Navigation Satellite System (GNSS) which transmits a precise location along with a time signal allowing the navigation module 43 to determine the geolocation of the versatile electric transport device 10. The geolocation of the versatile electric transport device 10 can be expressed as geo-coordinates such as are known, e.g., latitude and longitude coordinates.

The communications device 74 can be a smartphone, a portable computer or a wearable device which allows the user 28 to communicate with the versatile electric transport device 10. The communications device 74 can control the movement of the versatile electric transport device 10 along a desired path or alternatively instruct the transport device 10 to follow the user 28 who placed their groceries on the transport device 10. In one scenario, a user 28 can use a communications device 74 to request the versatile electric transport device 10 to come to their location from a fleet of versatile electric transport devices 10 which are placed throughout various neighborhoods in a city.

The transport device 10 can have a speaker or a piezo device to communicate with a user 28 an aural warning of a potential system failure or fault of the transport device 10, for example, a low battery condition, an emergency stopping of the transport device 10, a potential loss of balance of the user 28, etc. In addition to the aural warning, the transport device 10 can provide a haptic feedback through the platform 32 or to the user 28 communications device 74.

Process Flows

Figure 12:
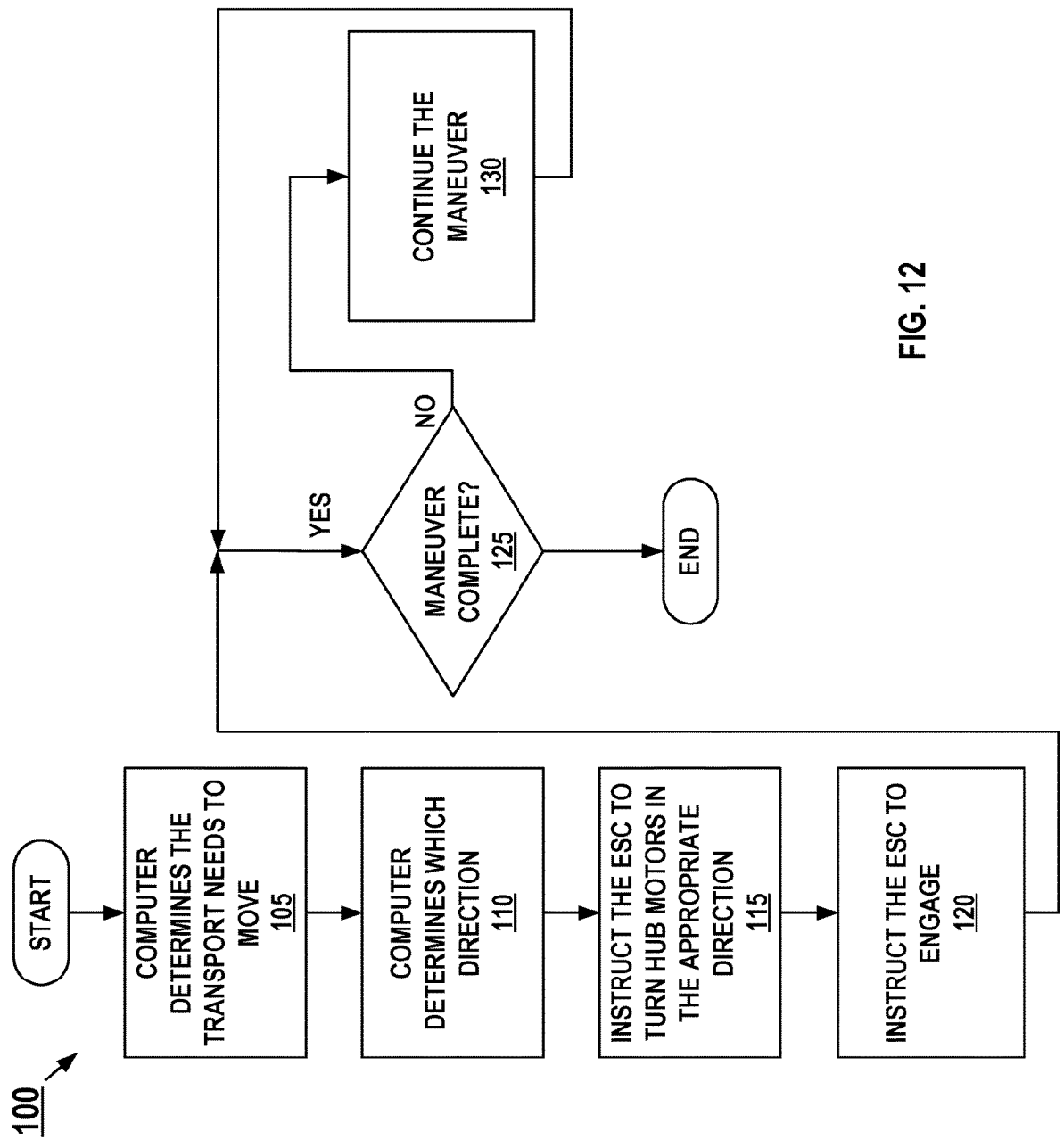
FIG. 12 is a flowchart of an exemplary process that may be implemented in a transport control computer and associated hardware components of the system of FIG. 11.

FIG. 12 is a flow chart illustrating an exemplary process 100 that can be executed according to programming in a versatile electric transport device 10 transport computer 66 to move the versatile electric transport device 10 in response to a request from a user 28.

The process 100 begins in a block 105, in which the transport computer 66 determines that the versatile electric transport device 10 needs to move from its current location.

Next, in a block 110, the transport computer 66 determines in which direction the versatile electric transport device 10 needs to go, for example, to the right as shown in FIG. 8C.

Next, in the block 115, the transport computer 66 sends programming instructions to the appropriate electronic speed controller (ESC) 16, for example, to move the versatile electric transport device 10 to the right, the, the front left (FL) wheel will be programmed to turn counterclockwise looking at the versatile electric transport device 10 side where the wheel 40 is located. The right rear (RR) and the rear left (RL) wheels needs to be programmed to turn clockwise and the front right (FR) wheel needs to be programmed to turn counterclockwise. The ESC 16 programming also includes the speed at which each wheel will turn.

Next, in a block 120, the transport computer 66 instructs the ESC 16 to engage and begin turning the wheel 40

Next, in a block 125, which can also be entered into from in a block 130, the transport computer 66 determines if the maneuver is complete. If the maneuver is complete, the process 100 ends, else next in the block 130 is executed.

Next, in the block 130, the transport computer 66 continues to send commands to the ESC 16 to continue the wheel 40 rotations and the process 100 returns to in the block 125.

Figure 13:
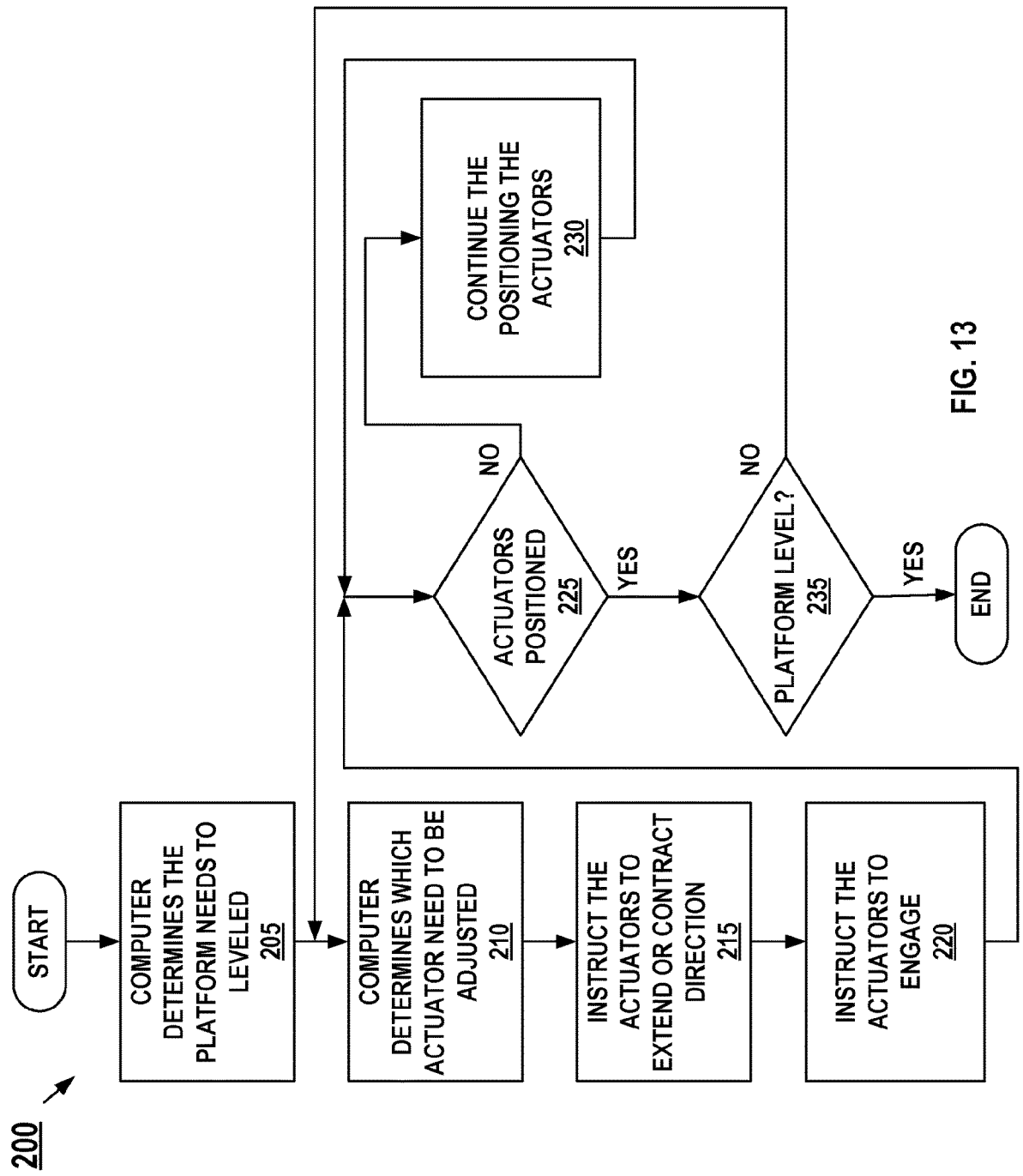
FIG. 13 is a flowchart of an exemplary process that may be implemented in a transport control computer and associated hardware components of the system of FIG. 11.

FIG. 13 is a flow chart illustrating an exemplary process 200 that may be executed simultaneously with the process 100 according to programming in a versatile electric transport device 10 transport computer 66 to keep the platform 32 level using the actuator 44.

The process 200 begins in a block 205, in which the transport computer 66 determines that the platform 32 needs to be leveled.

Next, in a block 210, which can also be entered from in the block 235, the transport computer 66 determines which actuator 44 needs to be extended, retract or left in its current position. For example, the weight distribution on the platform 32 is greater on the right side of the platform 32 and the platform is listing to the right. Therefore, the actuator 44 on the right side of the versatile electric transport device 10 will need to be extended raising the platform 32.

Next, in the block 215, the transport computer 66 sends programming instructions to the appropriate actuator 44 to extend, retract or remain in its current position to get the platform 32 level.

Next, in a block 220, the transport computer 66 instructs the actuator 44 to engage and begin extending or retracting.

Next, in a block 225, which can also be entered into from in a block 230, the transport computer 66 determines if the actuator 44 have completed their extension or retraction be receiving feedback from the actuator 44. If the extension or retraction is not complete, next in the block 230 is executed, else next a block 235 is executed.

Next, in the block 230, the transport computer 66 continues to send commands to the actuator 44 to continue activating the actuator 44 and the process 100 returns to in the block 225.

Next, in the block 235, the transport computer 66 determines if the platform 32 is level, for example, from the gyroscopic sensor on the platform 32. If the platform is level, the process 200 ends, else next the block 210 is executed.

Figure 14:
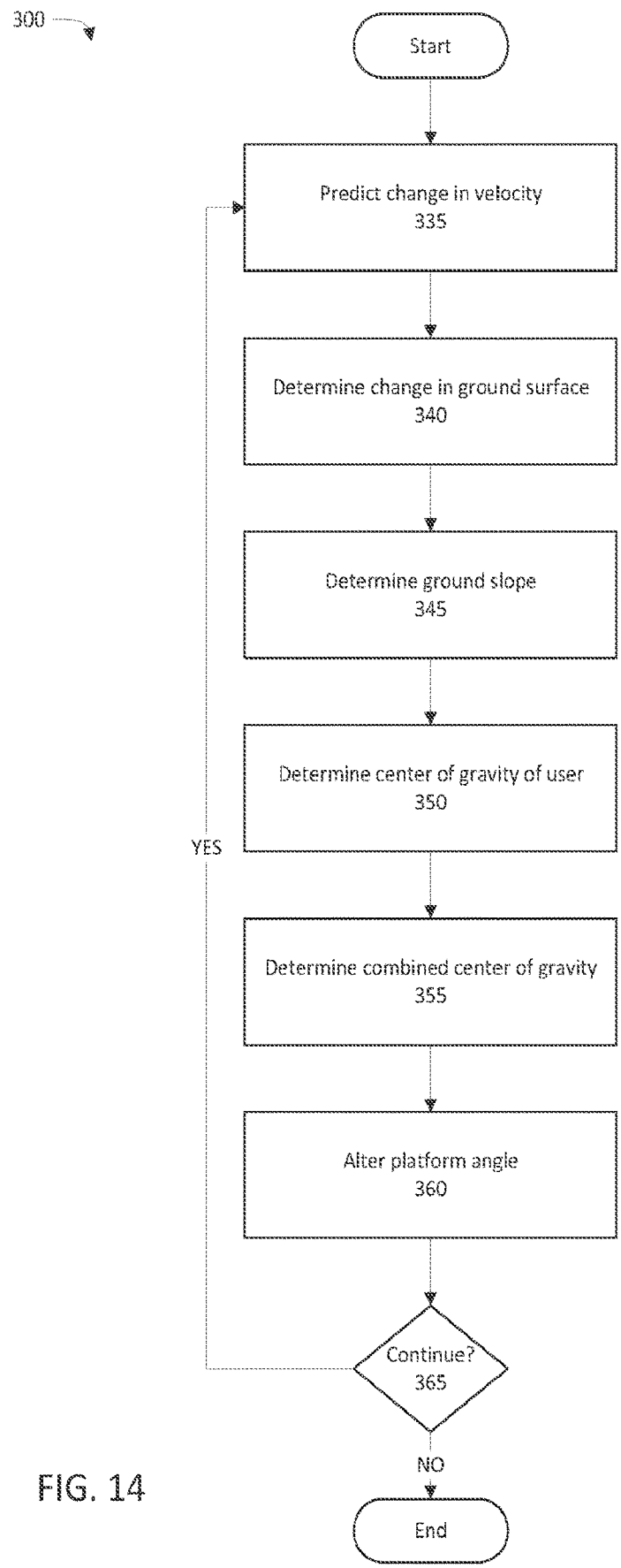
FIG. 14 is a flowchart of an exemplary process that may be implemented in a transport control computer and associated hardware components of the system of FIG. 11.

FIG. 14 is a flow chart illustrating an exemplary process 300 that may be executed simultaneously with the process 100 and the process 200 according to programming in a versatile electric transport device 10 transport computer 66 to control the tilt angle of the platform 32 using the actuator 44.

The process begins in block 335 after the transport device 10 is turned on, in which the transport computer 66 predicts a change in velocity of the transport device 10, e.g., as discussed above. The change in velocity can be a positive or negative change in speed such as an acceleration or deceleration, a change in direction such as a turn, or a combination thereof.

Next, in block 320, the transport computer 66 determines a change in the ground surface on which the transport device 10 is based. The change in ground surface may be a positive anomaly from the surface such as a speed bump or rock, it may be a negative anomaly from the surface such as a divot or pothole, or it may be a change in elevation of the surface such as a curb or ledge. Techniques for making such a determination using sensor data, e.g. cameras, LIDAR, and/or ultrasound, etc. are known.

Next, in block 345, the transport computer 66 determines a slope angle of the ground on which the transport device 10 is traveling. The slope angle of the ground may be determined via known techniques for detecting inclination of a travel path, e.g., a gyroscope sensor mounted on the frame 50, the gyroscope sensor in communication with the transport computer 66.

Next, in block 350, the transport computer 66 determines a center of gravity of the user on the platform 32.

Next, in block 355, the transport computer determines a combined center of gravity of the transport device 10 and the user of the transport device 10.

Next, in block 360, the transport computer 66 controls the actuators 33 to alter the tilt angle of the platform 32 based on the various predictions and determinations of blocks 335 through 355. As few a one, and as many as all, of the various predictions and determinations of blocks 335 through 355 may be used by the transport computer 66 when altering the tilt angle of the platform 32. The process ends when the transport device 10 is turned off.

Figure 15:
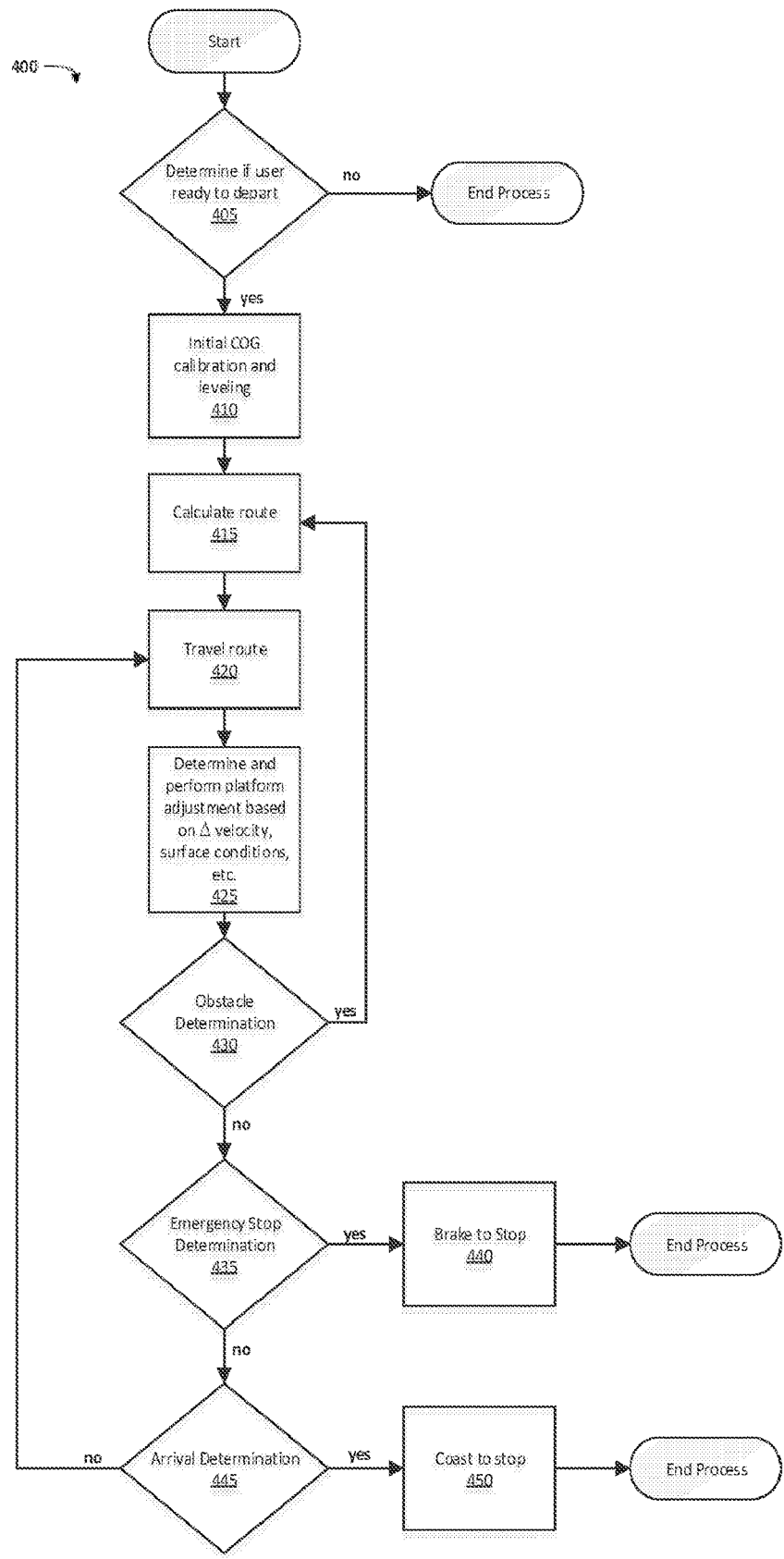
FIG. 15 is a flowchart of an exemplary process that may be implemented in a transport control computer and associated hardware components of the system of FIG. 11.

FIG. 15 is a flow chart illustrating an exemplary process 400 that may be executed simultaneously with the process 100, the process 200 and the process 300 according to programming in a versatile electric transport device 10 transport computer 66 to control the transport device 10.

The process 400 begins when the device is powered on, or transitioned to a ready mode from a standby mode. The standby mode is a known power saving mode of a computing device where various programs and applications are paused, and only a few basic functions are provided with power. For example, in the standby mode the transport computer 66 might pause various calculations and input monitoring used for the process 300 described above, while continuing to run other instructions and monitor other inputs, such as receiving various communications. The ready mode may be requested by a user of the transport device 10, the transport computer 66, and/or another computer communicating with the transport computer 66.

At a block 405, the transport computer 66 determines that a user has boarded the transport device 10 and is ready to depart. Such determination is made, for example, by the transport computer 66 receiving information from the weight sensors proximate the mounting location 52 of each actuator 44 indicating that the user is on the platform 32. When the user steps off the transport device 10, as may be identified by the weight sensor information, before a predetermined amount of time has lapsed, 10 seconds for example, the process 400 ends and the transport computer 66 returns to the standby mode. When the user stays on the platform 32 longer than the predetermined amount of time, the transport computer 66 determines that the user is ready to depart.

Next, at a block 410, the transport computer 66 uses the weight information from the weight sensors and determines the center of gravity of the user on the platform 32. For example, known calculations may be used to compare the values of the weight sensors relative to each other. Based on the determined center of gravity, the transport computer 66 performs an initial adjustment of the actuators 44 to angle the platform 32.

At a block 415 the transport computer 66 calculates a route to be traveled by the transport device 10 to arrive at a specific destination. To calculate the route, the transport computer determines the current location of the transport device 10, such as with the navigation device, the navigation module 43, and/or known GNSS systems, as discussed above. In further example, the navigation device, the navigation module 43, and/or known GNSS systems are then used along with the current location information and the specific destination information to calculate the route to be traveled by the transport device 10. When calculating the route, the transport computer 66 may take into consideration travel conditions, such as surface type, congestion, speed limits, road closures, construction, obstacles, etc.

Next, at a block 420, after the user has boarded in the block 405 and the route has been calculated in the block 415, the transport computer 66 instructs the transport device 10 to travel to the specific destination via the calculated route. For example, to travel along the route process 100 may be used along with the navigation device, the navigation module 43, and/or known GNSS systems.

Next, at a block 425, as the transport device 10 travels the calculated route, the transport computer 66 adjusts the platform 32 angle based on predicated changes in velocity, detected surface conditions and angles, etc., as disused above. For example, the process 200 and the process 300 may be used. After adjustment, the transport computer 66 returns to block 420, instructing the transport device 10 to continue to travel to the specific destination via the calculated route in a looped manner until the process 400 ends.

Next, at a block 430, also as the transport device 10 travels along the calculated route, the transport computer 66 determines if an obstacle exist along the calculated route. Obstacles may be determined based on information about the route received by the transport computer 66, for example from the navigation device, the navigation module 43, and/or known GNSS systems, and/or may be detected by the various sensors in communication with the transport computer 66, such as proximity sensors, LIDAR, image devices etc. Exemplary obstacles include closed roads, unexpected physical objects blocking the route, etc. When an obstacle is determined to exist along the route, the transport computer 66 returns to block 415 to re-calculate the route based in part on the determined obstacle. After the route has been recalculated, the process 400 continues from block 415 in a looped manner until the process 400 ends.

Next, at a block 435, also as the transport device 10 travels to the specific destination, the transport computer 66 determines when an emergency stop is necessary. The emergency stop determination is made by the transport computer 66 based on the information received from the various sensors in communication with the transport computer 66. One exemplary situation requiring the emergency stop determination exists when a sudden and unexpected object is detected in the travel path the transport device 10 by proximity sensors and the like, such as when a pedestrian walks in front the of transport device 10. Another exemplary situation requiring the emergency stop determination exists when there is a sudden and unexpected shift in the measurement value of the weight sensors, such as when the user prematurely vacates the transport device 10. When the determination is made that the emergency stop is necessary, the transport computer 66 moves to a block 440 and instructs the transport device 10 to stop in a manner that prioritizes bringing the transport device 10 to a halt quickly, such as by applying brakes of the transport device 10. Once the transport device 10 stops, the process 400 ends. When no emergency stop is determined to be necessary the process 400 continues from block 420 in a looped manner until the process 400 ends.

Next, at a block 445, the transport computer 66 determines the transport device 10 has arrived at the specific location. The determination that the transport device 10 has arrived at the destination may be based on information received from the navigation device, the navigation module 43, and/or known GNSS systems, as discussed above. When the transport device 10 is determined to be at the specific destination, the transport computer 66 moves to a block 450 and brings the transport device to a stop prioritizing efficiency and/or user comfort. For example, the transport device 10 may be stopped using known regenerative braking techniques, and/or, may be instructed to coast to a stop. Once the transport device 10 has stopped, the process 400 ends. When no arrival at the destination is determined, the process 400 continues from block 420 in a looped manner until the process 400 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C #, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory, the memory storing instructions executable by the processor, the instructions including instructions for:
    predicting a change in velocity of a transport device;
    determining a change in a ground surface on which the transport device is traveling; and
    then altering a tilt angle of a riding platform of the transport device based at least in part on the predicted change in velocity and the change in the ground surface, wherein the change in ground surface includes a positive anomaly, a negative anomaly, a curb, or a ledge.

2. The controller of claim 1, wherein the instructions further comprise:
    determining a slope angle of the ground on which the transport device is traveling; and
    then altering the tilt angle of the platform based at least in part on the slope angle of the ground on which the transport device is traveling.

3. The controller of claim 2, wherein instructions for altering the tilt angle of the platform based at least in part on the slope angle of the ground on which the transport device is traveling include instructions to maintain the platform within a predetermined tolerance of deviation from the slope angle of the ground.

4. The controller of claim 1, wherein the instructions further comprise using an inverted pendulum algorithm to determine the altered tilt angle of the platform.

5. The controller of claim 1, wherein the instructions further comprise:
    determining a center of gravity location of a user of the transport device; and
    then altering the tilt angle of the platform based at least in part on the determined center of gravity location.

6. The controller of claim 1, wherein the instruction further comprise:
    determining a combined center of gravity location of a user of the transport device and the transport device; and
    then altering the tilt angle of the platform based at least in part on the determined combined center of gravity location.

7. A transport device comprising:
    a frame;
    a platform pivotally mounted on the frame;
    an actuator fixed to the platform and the frame; and
    a controller in communication with the actuator, the controller comprising a processor and a memory, the memory storing instructions executable by the processor, the instructions including instructions for:
    predicting a change in velocity of the transport device;
    determining a change in a ground surface on which the transport device is traveling; and
    then altering a tilt angle of a riding platform of the transport device based at least in part on the predicted change in velocity and the change in the ground surface, wherein the change in ground surface includes a positive anomaly, a negative anomaly, a curb, or a ledge.

8. The transport device of claim 7, wherein the instructions further comprise:
    determining a slope angle of the ground on which the transport device is traveling; and
    then controlling the actuator to alter the tilt angle of the platform based at least in part on the determined slope angle of the ground on which the transport device is traveling.

9. The transport device of claim 8, wherein controlling the actuator to alter the tilt angle of the platform based at least in part on the slope angle of the ground on which the transport device is traveling is performed such that the platform is maintained within a predetermined tolerance of deviation from the slope angle of the ground.

10. The transport device of claim 7, wherein controlling the actuator to alter the tilt angle of the platform based at least in part on the predicted change in velocity uses an inverted pendulum algorithm.

11. The transport device of claim 7 further comprising:
    the platform having opposing first and second surfaces, the second surface being convex; and
    the frame having a concave surface mateable to the convex second surface of the platform.

12. The transport device of claim 7, wherein the instructions further comprise:
    determining a center of gravity location of a user of the transport device; and
    then controlling the actuator to alter the tilt angle of the of the platform based at least in part on the determined center of gravity location.

13. The transport device of claim 7, wherein the instructions further comprise:

determining a combined center of gravity location of a user of the transport device and the transport device; and then controlling the actuator to alter the tilt angle of the platform based at least in part on the determined combined center of gravity location.

14. A method for controlling a tilt angle of a riding platform of a transport device, the method comprising:

predicting a change in velocity of the transport device;

determining a change in a ground surface on which the transport device is traveling; and then altering a tilt angle of a riding platform of the transport device based at least in part on the predicted change in velocity and the change in the ground surface, wherein the change in ground surface includes a positive anomaly, a negative anomaly, a curb, or a ledge.

15. The method of claim 14, further comprising:

determining a slope angle of the ground on which the transport device is traveling; and then altering the tilt angle of the platform based at least in part on the slope angle of the ground on which the transport device is traveling.

16. The method of claim 14, further comprising using an inverted pendulum algorithm to determine the altered tilt angle of the platform.

17. The method of claim 14, further comprising:

determining a center of gravity location of a user of the transport device; and then altering the tilt angle of the platform based at least in part on the determined center of gravity location.

* * * * *